(12) United States Patent
Dudhe et al.

(10) Patent No.: US 10,673,888 B1
(45) Date of Patent: Jun. 2, 2020

(54) SYSTEMS AND METHODS FOR MANAGING ILLEGITIMATE AUTHENTICATION ATTEMPTS

(71) Applicant: CA, INC., San Jose, CA (US)

(72) Inventors: Ajey Dudhe, Pune (IN); Rupesh Khetawat, Pune (IN); Mahesh Pol, Pune (IN); Sumit Jain, Pune (IN)

(73) Assignee: CA, Inc., San Jose, CA (US)

(*) Notice: Subject to any disclaimer, the term of this patent is extended or adjusted under 35 U.S.C. 154(b) by 137 days.

(21) Appl. No.: 15/842,095

(22) Filed: Dec. 14, 2017

(51) Int. Cl.
*H04L 29/06* (2006.01)
*G06K 9/00* (2006.01)

(52) U.S. Cl.
CPC ...... *H04L 63/1433* (2013.01); *G06K 9/00228* (2013.01); *G06K 9/00288* (2013.01); *G06K 9/00899* (2013.01); *H04L 63/0861* (2013.01); *H04L 63/1491* (2013.01)

(58) Field of Classification Search
CPC ............. H04L 63/1433; H04L 63/1491; H04L 63/0861; G06K 9/00288; G06K 9/00899; G06K 9/00228
See application file for complete search history.

(56) References Cited

U.S. PATENT DOCUMENTS

| | | | | |
|---|---|---|---|---|
| 3,473,522 A * | 10/1969 | Bailey | | F02M 1/00 123/556 |
| 8,457,367 B1 * | 6/2013 | Sipe | | G06K 9/00221 382/118 |
| 8,973,137 B1 * | 3/2015 | Oliver | | G06F 21/566 726/23 |
| 9,467,855 B1 * | 10/2016 | Kaushik | | H04W 12/06 |
| 9,742,776 B2 * | 8/2017 | Lewis | | H04L 63/101 |
| 9,825,928 B2 * | 11/2017 | Lelcuk | | H04L 63/08 |
| 9,912,695 B1 * | 3/2018 | Chao | | H04L 63/1491 |
| 2006/0075504 A1 * | 4/2006 | Liu | | G06F 11/2294 726/25 |
| 2016/0335483 A1 * | 11/2016 | Pfursich | | G06K 9/00899 |
| 2018/0351956 A1 * | 12/2018 | Verma | | H04L 63/102 |

OTHER PUBLICATIONS

TRAPX Security, "TRAPX deepens deception capabilities with DeceptionGrid 6.0", URL: https://trapx.com/trapx-deepens-deception-capabilities-with-deceptiongrid-6-0/, Feb. 13, 2017, pp. 1-4.

* cited by examiner

*Primary Examiner* — Abu S Sholeman
(74) *Attorney, Agent, or Firm* — FisherBroyles, LLP

(57) ABSTRACT

The disclosed computer-implemented method for managing illegitimate authentication attempts may include (i) detecting an authentication attempt performed by a user to gain access to a protected computing environment, (ii) determining that the authentication attempt to access the protected computing environment is illegitimate, and (iii) simulating, in response to the determination, a successful attempt to authenticate to the protected computing environment by presenting the user with access to a catch-all environment that poses as the protected computing environment and that isolates the protected computing environment from the user. Various other methods, systems, and computer-readable media are also disclosed.

20 Claims, 8 Drawing Sheets

SYSTEMS AND METHODS FOR MANAGING ILLEGITIMATE AUTHENTICATION ATTEMPTS

BACKGROUND

Mobile devices are increasingly popular tools for accessing a wide variety of services and information. With this increased popularity, thieves and other malicious individuals are increasingly attempting to steal and repurpose mobile devices. Traditional modes of securing mobile devices against these malicious entities may include securing the device with a password or other form of passcode to prevent unauthorized access. Such traditional security measures may manage illegitimate authentication attempts by wiping data on the device after a certain number of failed authentication attempts in order to protect user data from brute-force attacks.

Unfortunately, traditional security measures for mobile devices may wipe device data in an inappropriate scenario. For example, a mobile device may be configured with software that enables a legitimate user to track the device's location. Such tracking software and/or any other software installed on the device may be wiped by the device's security system, thus negating the user's ability to track down the mobile device or perform other remote functions that may aid in recovering the device. As an additional example, a young child may stumble across a mobile device and accidentally trigger a device wipe, despite not actually attempting to access the device with malicious intent. Moreover, traditional mobile device security generally does not allow for a "good Samaritan" to identify information that would assist in returning the device to its owner. The instant disclosure, therefore, identifies and addresses a need for systems and methods for managing illegitimate authentication attempts.

SUMMARY

As will be described in greater detail below, the instant disclosure describes various systems and methods for managing illegitimate authentication attempts. In one example, a computer-implemented method for managing illegitimate authentication attempts may include (i) detecting an authentication attempt performed by a user to gain access to a protected computing environment, (ii) determining that the authentication attempt to access the protected computing environment is illegitimate, and (iii) simulating, in response to the determination, a successful attempt to authenticate to the protected computing environment by presenting the user with access to a catch-all environment that poses as the protected computing environment and that isolates the protected computing environment from the user.

The computer-implemented method may further include, in response to simulating the successful authentication attempt, preventing deletion of information stored within the protected computing environment. Moreover, the protected computing environment and the catch-all environment may reside on a single mobile device.

In some examples, determining that the authentication attempt is illegitimate may include determining that the user has entered an incorrect password. In these examples, determining that the authentication attempt is illegitimate may include determining that the incorrect password is represented on a previously configured list of commonly guessed passwords. Additionally or alternatively, determining that the authentication attempt is illegitimate may include: (i) capturing an image of the user's face, (ii) for each known legitimate operator of the protected computing environment, attempting to match the image of the user's face to an image of the known legitimate operator, and (iii) determining, based on failing to match the image of the user's face to any image of a known legitimate operator of the protected computing environment, that the authentication attempt is illegitimate.

In some embodiments, the computer-implemented method may determine that the authentication attempt is benign despite being illegitimate. In such embodiments, the computer-implemented method may include modifying the configuration of the catch-all environment by revealing, within the catch-all environment, pre-configured private information to the user based on determining that the authentication attempt is benign. Classifying the authentication attempt as benign may include performing a facial state analysis on a captured image of the user's face to determine a facial expression of the user. The computer-implemented method may then classify the authentication attempt as benign based on the facial expression of the user.

The above-described method may simulate the successful authentication attempt in response to a variety of factors. For example, simulating the successful attempt to authenticate to the protected computing environment may occur in response to detecting a preconfigured number of illegitimate authentication attempts that includes two or more illegitimate authentication attempts.

The catch-all environment may include a variety of features that help the catch-all environment pose as the protected computing environment. In one embodiment, the catch-all environment may pose as the protected computing environment by providing the user with access to applications that are unable to access private information stored within the protected computing environment. In further embodiments, the catch-all environment may pose as the protected computing environment by providing the user with access to decoy files that pose as legitimate files. Additionally or alternatively, the catch-all environment may pose as the protected computing environment and isolate the protected computing environment from the user by presenting the user with an error message in response to the user attempting to perform a restricted action from within the catch-all environment. Furthermore, the catch-all environment may pose as the protected computing environment by reproducing a user interface of the protected computing environment.

The above-described method may also perform security actions in response to detecting the illegitimate authentication attempts. For example, the computer-implemented method may include performing, in response to the determination, a security action that may include (i) capturing an image of the user's face, (ii) notifying a legitimate operator of the protected computing environment, (iii) capturing a location of a physical device that executes the protected computing environment and the catch-all environment, and/or (iv) encrypting private data that resides within the protected computing environment.

In one embodiment, the computer-implemented method may further include configuring, prior to detecting the authentication attempt, the catch-all environment to provide the user with (i) a decoy file that does not contain private information, (ii) an application that is executable from within the catch-all environment, (iii) legitimate contact information to an individual on a contacts list that resides within the protected computing environment, and/or (iv) access to a function that is enabled by the protected computing environment and is not a restricted function that is restricted by a legitimate operator of the protected computing environment.

In one embodiment, a system for implementing the above-described method may include (i) a detection module, stored in a memory of the system, that detects an authentication attempt performed by a user to gain access to a protected computing environment, (ii) a determination module, stored in the memory, that determines that the authentication attempt to access the protected computing environment is illegitimate, (iii) a simulation module, stored in the memory, that simulates, in response to the determination, a successful attempt to authenticate to the protected computing environment by presenting the user with access to a catch-all environment that poses as the protected computing environment and that isolates the protected computing environment from the user, and (iv) at least one physical processor configured to execute the detection module, the determination module, and the simulation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect an authentication attempt performed by a user to gain access to a protected computing environment, (ii) determine that the authentication attempt to access the protected computing environment is illegitimate, and (iii) simulate, in response to the determination, a successful attempt to authenticate to the protected computing environment by presenting the user with access to a catch-all environment that poses as the protected computing environment and that isolates the protected computing environment from the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
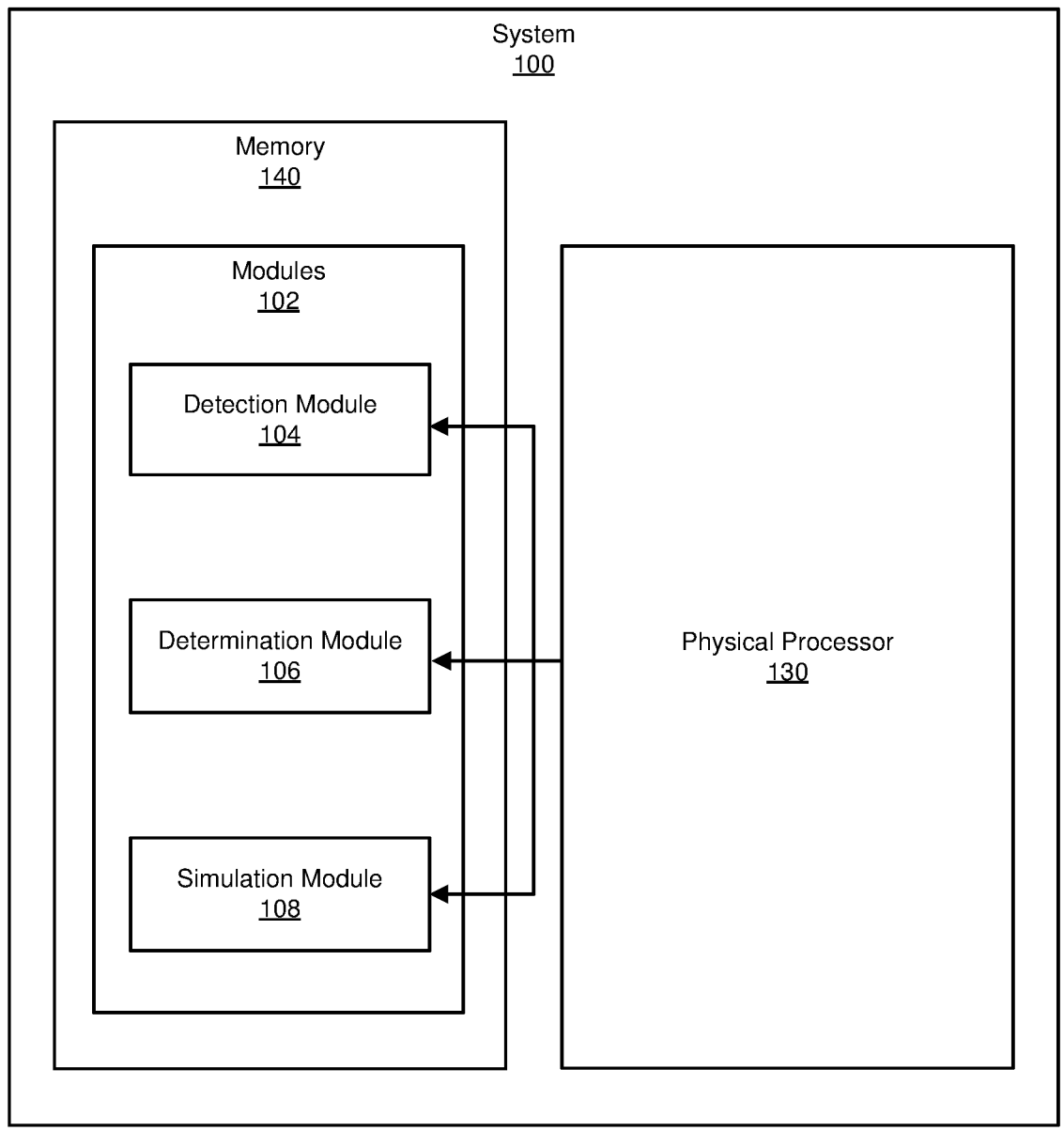
FIG. 1 is a block diagram of an example system for managing illegitimate authentication attempts.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing illegitimate authentication attempts. As will be described in greater detail below, the systems and methods may protect user privacy and enhance device security by responding to illegitimate authentication attempts with a catch-all computing environment. By managing illegitimate authentication attempts in this way, the systems and methods described herein may deceive malicious users into interacting with the catch-all environment, thereby negating the need to wipe data from the device to preserve user privacy. Such deception may also buy time for the device's owner and/or law enforcement to track the location of the device, capture images that may be used to identify the malicious user, and/or notify the device's owner. The systems and methods described herein may also aid "good Samaritan" users. For example, an individual who comes across a lost mobile device may wish to return that device to its rightful owner and attempt to probe the device for contact information that may aid in such a task. The systems and methods described herein may facilitate these illegitimate yet benign authentication attempts by causing the catch-all environment to provide the good Samaritan user with contact information that may be used to contact the device's owner.

Figure 2:
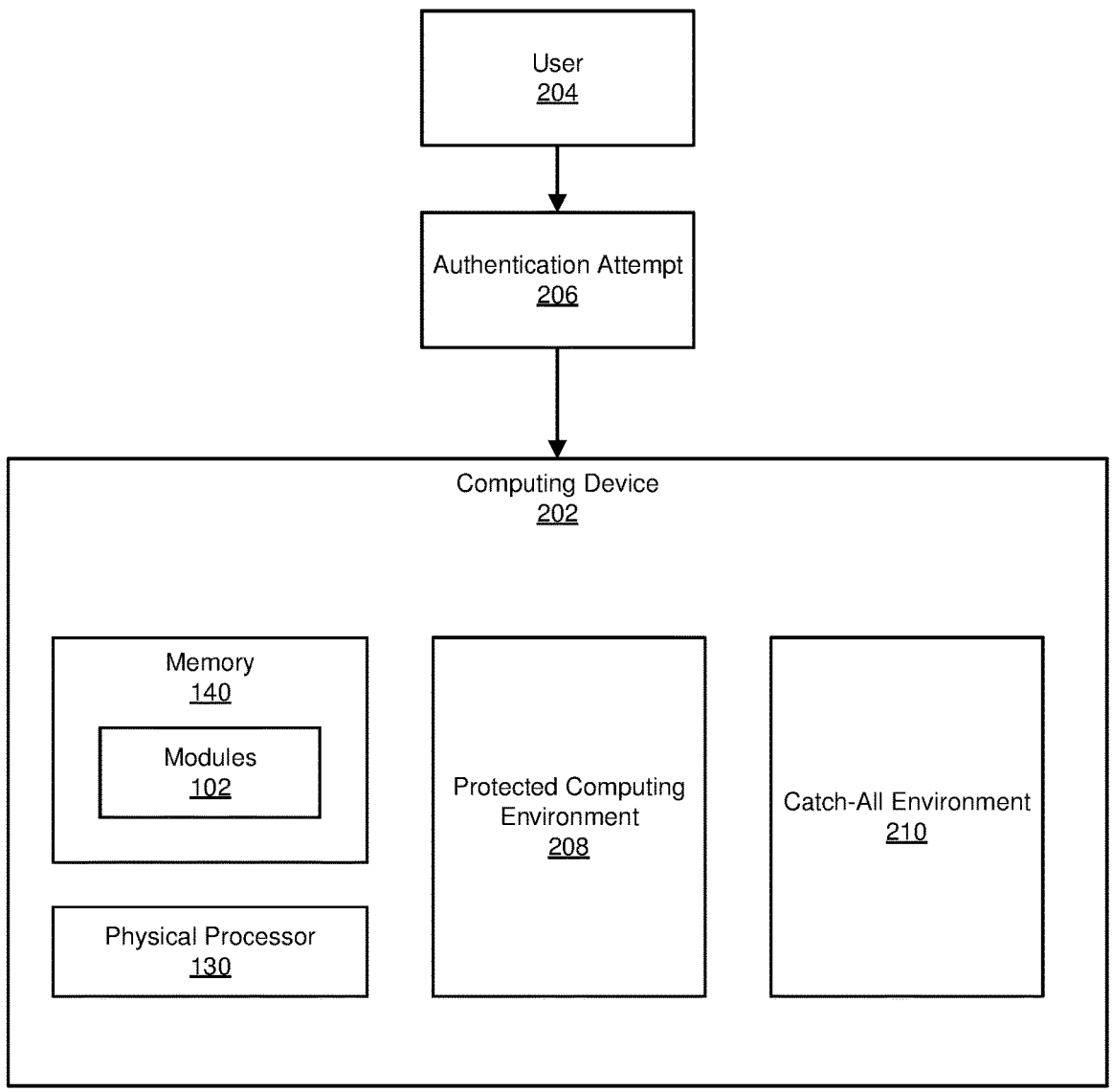
FIG. 2 is a block diagram of an additional example system for managing illegitimate authentication attempts.

The following will provide, with reference to FIGS. 1-2, detailed descriptions of example systems for managing illegitimate authentication attempts. Detailed descriptions of corresponding computer-implemented methods will also be provided in connection with FIG. 3. Detailed descriptions of additional example systems for managing illegitimate authentication attempts will be provided in connection with FIGS. 4 and 5, while detailed descriptions of example decision flows for managing illegitimate authentication attempts will be provided in connection with FIG. 6. In addition, detailed descriptions of an example computing system and network architecture capable of implementing one or more of the embodiments described herein will be provided in connection with FIGS. 7 and 8, respectively.

FIG. 1 is a block diagram of example system 100 for managing illegitimate authentication attempts. As illustrated in this figure, example system 100 may include one or more modules 102 for performing one or more tasks. For example, and as will be explained in greater detail below, example system 100 may include a detection module 104 that detects an authentication attempt performed by a user to gain access to a protected computing environment. Example system 100 may additionally include a determination module 106 that determines that the authentication attempt to access the protected computing environment is illegitimate. Example system 100 may also include a simulation module 108 that simulates, in response to the determination, a successful attempt to authenticate to the protected computing environment by presenting the user with access to a catch-all environment that poses as the protected computing environment and that isolates the protected computing environment from the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing illegitimate authentication attempts. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 configured to execute a variety of software. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to protect user privacy against illegitimate authentication attempts without necessarily wiping data from the computing device 202. For example, and as will be described in greater detail below, detection module 104 may detect an authentication attempt 206 performed by a user 204 to gain access to a protected computing environment 208. Determination module 106 may determine that authentication attempt 206 is illegitimate. Simulation module 108 may simulate, in response to the determination, a successful attempt to authenticate to protected computing environment 208 by presenting user 204 with access to a catch-all environment 210 that poses as protected computing environment 208 and isolates protected computing environment 208 from user 204.

Computing device 202 generally represents any type or form of computing device capable of reading computer-executable instructions that requires users to authenticate to the device before being granted access to functionalities provided by the device. In some embodiments, computing device 202 may represent a mobile device such as a smart phone or tablet computing device. In some examples, mobile devices may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile device and/or may interact with a mobile device. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device that requires users to authenticate to the device. Computing device 202 may execute a variety of computing environments, such as protected computing environment 208 and/or catch-all environment 210.

Protected computing environment 208 and catch-all environment 210 generally represent interfaces through which users may interact with data and applications stored on a computing device. A particular computing device may host multiple computing environments. For example, protected computing environment 208 and catch-all environment 210 may be hosted on the same computing device (e.g., computing device 202). Each computing environment executing on a particular device may be logically isolated from other computing environments executing on that device. In other words, actions taken from within a computing environment may be restricted to that computing environment, thereby allowing administrators and/or owners of a device to segregate information stored within one computing environment from users interacting with a different computing environment. Different computing environments may also have different privilege levels, granting those computing environments differing levels and/or ranges of access to information and/or software. For example, protected computing environment 208 may be able to modify and/or configure catch-all environment 210, but catch-all environment 210 may be unable to manipulate protected computing environment 208. In the examples provided herein, protected computing environment 208 may represent a primary environment and/or user account used by an owner and/or primary operator of computing device 202. Catch-all environment 210, on the other hand, may represent a computing environment that shields protected computing environment 208 and/or data stored on computing device 202 from illegitimate operators of computing device 202. In some embodiments, an administrator, owner, and/or primary user of computing device 202 may be able to configure catch-all environment 210 from within protected computing environment 208.

Figure 3:
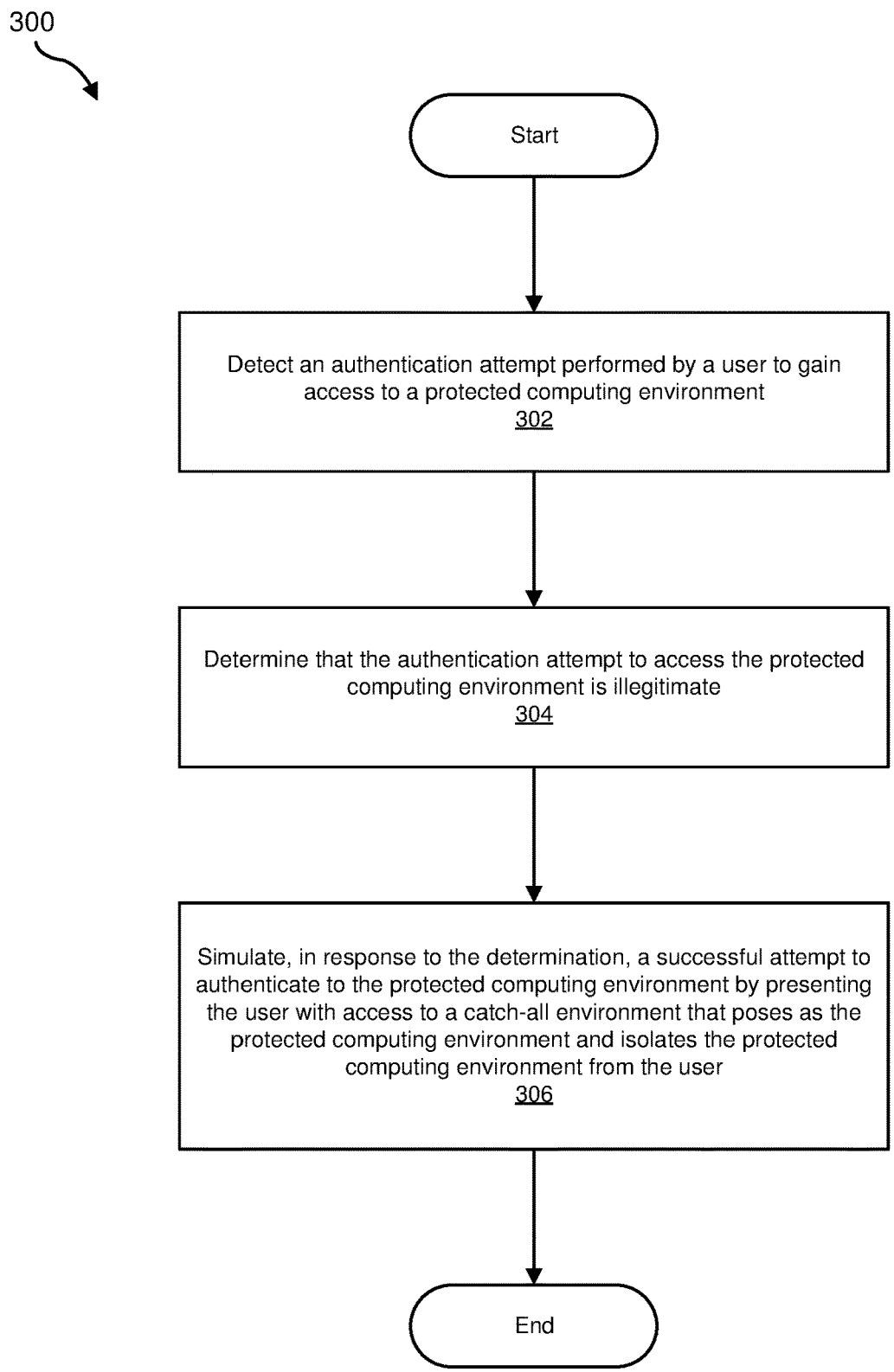
FIG. 3 is a flow diagram of an example method for managing illegitimate authentication attempts.

FIG. 3 is a flow diagram of an example computer-implemented method 300 for managing illegitimate authentication attempts. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect an authentication attempt performed by a user to gain access to a protected computing environment. For example, detection module 104 may, as part of computing device 202 in FIG. 2, detect authentication attempt 206 performed by user 204 to gain access to protected computing environment 208.

Detection module 104 may detect authentication attempt 206 in a variety of ways. For example, detection module 104 may execute as part of an operating system, hypervisor, or other software that manages authentication attempts for protected computing environment 208. In these embodiments, detection module 104 may detect that user 204 has initiated an authentication process, such as entering a password, providing an image of their face, activating a fingerprint scanner, etc.

Additionally or alternatively, detection module 104 may execute as part of a software security system that interfaces with an application programming interface ("API") of an authentication system for protected computing environment 208. In these embodiments, the authentication system may provide information about the authentication attempt to detection module 104 when a user performs an authentication attempt to access protected computing environment 208. For example, the authentication system may simply inform detection module 104 that a user has performed an authentication attempt. Additionally or alternatively, the authentication system may provide detection module 104 with information signifying that an incorrect authentication attempt has taken place.

Returning to FIG. 3, at step 304, one or more of the systems described herein may determine that the authentication attempt to access the protected computing environment is illegitimate. For example, determination module 106 may, as part of computing device 202 in FIG. 2, determine that authentication attempt 206 to access protected computing environment 208 is illegitimate.

Determination module 106 may determine that the authentication attempt is illegitimate in a variety of ways. In embodiments where user 204 performs authentication attempt 206 by entering a password, determination module 106 may determine that user 204 has entered an incorrect password. For example, determination module 106 may, as part of an authentication system that controls access to protected computing environment 208, compare the password and/or a hash of the password to a previously established record. Determination module 106 may determine that authentication attempt 206 has failed if determination module 106 determines that the entered password and/or a hash of the entered password does not match the information in the record.

Determination module 106 may additionally or alternatively determine that user 204 has entered a commonly guessed password (e.g., "1234") as part of authentication 206. Determination module 106 may compared the password entered by user 204 to a previously configured list of commonly guessed passwords to determine whether user 204 has entered a commonly guessed password as part of authentication attempt 206. Such a commonly guessed password may also fail to match a previously established record, but other elements of modules 102 may respond differently to commonly guessed passwords, as will be described in greater detail below.

In further embodiments, determination module 106 may analyze an image of a user's face. For example, determination module 106 may determine that authentication attempt 206 is illegitimate by capturing an image of user 204's face, comparing the captured image to images of known legitimate operators of computing device 202 and/or protected computing environment 208, and determining that the captured image of user 204's face does not match any image of a known legitimate operator of protected computing environment 208. Such facial analysis may be used in systems that allow a user's face to be used as a form of authentication, such as with APPLE FACE ID. In these examples, the face-based authentication system may maintain a database of legitimate operators in association with facial image data that may be used to identify legitimate operators based on an image of the user's face. A user whose face does not match a known legitimate operator of protected computing environment 208 may thus be barred from accessing protected computing environment 208, and may instead be presented with catch-all environment 210.

Such facial image capture may occur without the user's knowledge. For example, user 204 may enter a password as part of performing authentication 206. Determination module 106 may concurrently capture an image of user 204's face without alerting user 204 (e.g., by not displaying an indication on a user interface of computing device 202) and perform the above-described analysis to determine whether or not user 204 is a legitimate operator of protected computing environment 208. In this manner, the systems and methods described herein may be able to ensure that protected computing environment 208 remains secure even in the event that an illegitimate operator has managed to acquire the correct password to access protected computing environment 208. As will be described in greater detail below, presenting user 204 with catch-all environment 210 in these scenarios may deceive such a user into believing that they have obtained access to protected computing environment 208. Such deception may buy time for a legitimate operator, law enforcement services, and/or other software systems on computing device 202 to take steps to secure computing device and/or protected computing environment 208.

In some embodiments, determination module 106 may classify authentication attempt 206 as benign despite being illegitimate. For example, determination module 106 may capture an image of user 204's face and determine that user 204 is a young child. As may be appreciated by parents, young children may inadvertently trigger authentication attempts to devices by playing with the device. Determination module 106 may accordingly determine that an illegitimate authentication attempt performed by a young child represents a benign illegitimate authentication attempt. In another example, determination module 106 may determine that an incorrectly entered password appears to represent a legitimate attempt at entering a password. For example, determination module 106 may compare the incorrectly entered password with one or more previously used passwords and determine that the incorrectly entered password matches one of the previously used passwords (e.g., suggesting that the user has entered a previously valid, but no longer valid, password out of habit or confusion). In this example, determination module 106 may accordingly determine that the illegitimate authentication attempt represents a benign illegitimate authentication attempt.

Additionally or alternatively, determination module 106 may perform a facial state analysis on the image of user 204's face. In these examples, determination module 106 may analyze the image to determine a facial expression of the user, such as concern, frustration, fear, etc. Determination module 106 may, depending on the facial expression of the user, classify the authentication attempt as benign. For example, a user who is expressing concern may be attempting to use computing device 202 to contact emergency services. As an additional example, a concerned user may be attempting to identify contact information to return computing device 202 to an authorized user and/or owner. Determination module 106 may accordingly determine that users expressing concern or other indicators of benign intentions as benign authentication attempts, even if those authentication attempts are illegitimate. Additionally or alternatively, determination module 106 may prompt simulation module 108 to present user 204 with an alternate catch-all environment, as will be described in greater detail below.

Figure 4:
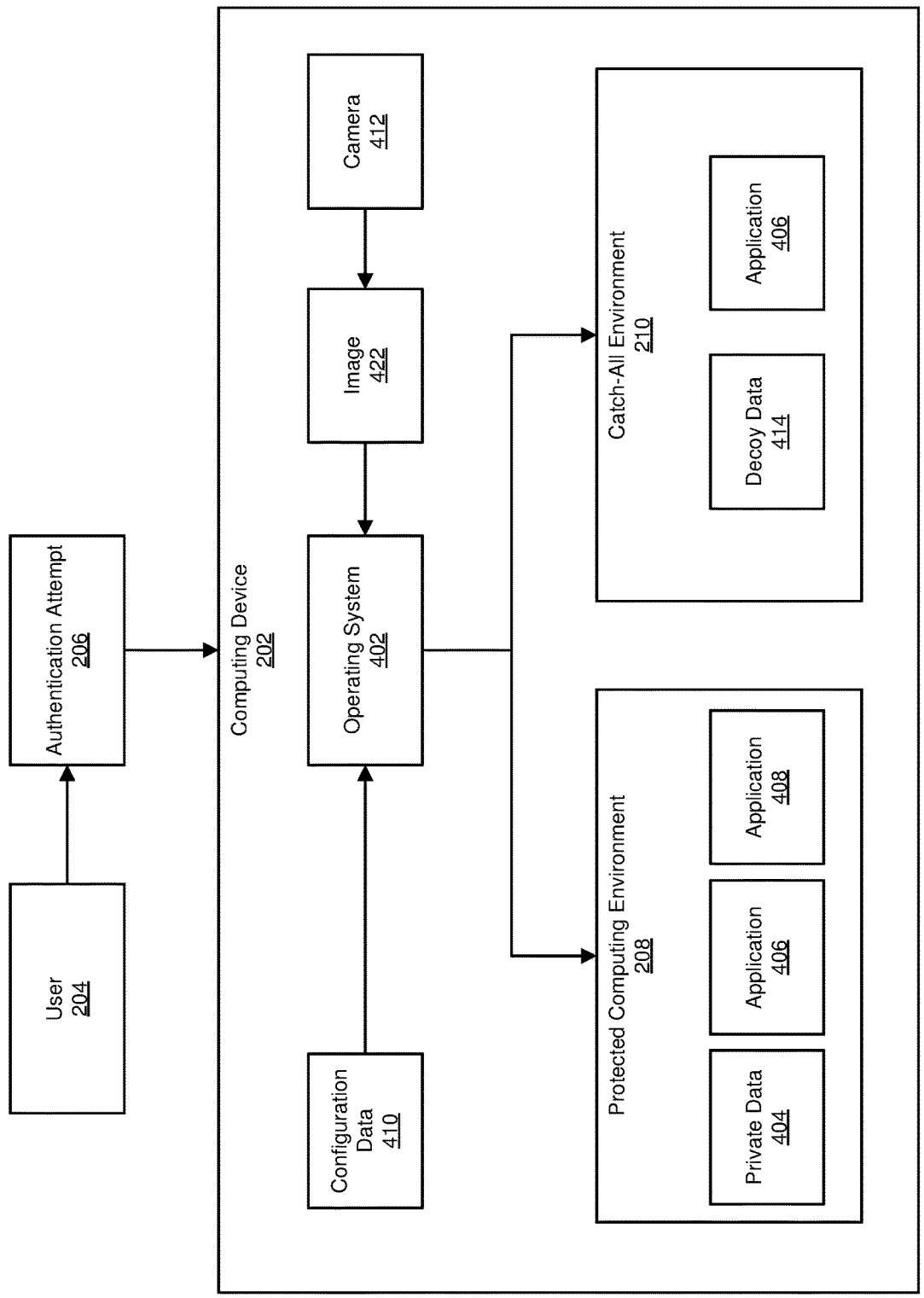
FIG. 4 is a block diagram of an additional example computing system for managing illegitimate authentication attempts.

FIG. 4 provides an illustrated example of a computing device that utilizes images of a user's face to determine whether authentication attempt 206 is legitimate. As shown in FIG. 4, user 204 may submit authentication attempt 206 to an operating system 402 of computing device 202. Operating system 402 may maintain configuration data 410 that allows an authentication system of operating system 402 to determine whether authentication attempt 206 is an illegitimate authentication attempt. Operating system 402 may also interface with hardware such as a camera 412 of computing device 202 and acquire image 422 of user 204's face. Operating system 402 may use image 422 in conjunction with configuration data 410 to determine whether authentication attempt 206 is illegitimate and/or benign.

In embodiments where the systems and methods described herein receive information from an authentication system that protects protected computing environment 208, the authentication system may inform determination module 106 that authentication attempt 206 is an incorrect authentication attempt. Determination module 106 may then determine that authentication attempt 206 is an illegitimate authentication attempt either based on this information alone or in combination with one or more of the aforementioned methods of determining whether authentication attempt 206 is illegitimate and/or benign.

At step 306 in FIG. 3, one or more of the systems described herein may simulate, in response to the determination, a successful attempt to authenticate to the protected computing environment by presenting the user with access to a catch-all environment that poses as the protected computing environment and that isolates the protected computing environment from the user. For example, simulation module 108 may, as part of computing device 202 in FIG. 2, simulate, in response to the determination, a successful attempt to authenticate to protected computing environment 208 by presenting user 204 with access to catch-all environment 210 that poses as protected computing environment 208 and that isolates protected computing environment 208 from user 204.

In some embodiments, the systems and methods described herein may include configuring catch-all environment 210 prior to detecting authentication attempt 206. Legitimate operators may configure catch-all environment 210 to display a variety of items, including but not limited to decoy files that do not contain private information (e.g., decoy data 414 in FIG. 4), applications that are executable from within catch-all environment 210 (e.g., application 406), legitimate contact information to an individual on a contacts list that resides within protected computing environment 208, and/or access to functions that are enabled by protected computing environment 208 and are not restricted by a legitimate operator of computing device 202 and/or protected computing environment 208.

A legitimate operator may configure catch-all environment 210 in a variety of ways. In some examples, the operator may configure catch-all environment 210 through applications and/or interfaces available in protected computing environment 208. For example, the operator may configure catch-all environment 210 through a settings application available within protected computing environment 208. Additionally or alternatively, the operator may configure catch-all environment through software on an additional computing device connected to computing device 202. For example, computing device 202 may represent a mobile phone such as an APPLE IPHONE. The operator may configure catch-all environment through software on a desktop computer that connects to the mobile phone and is able to alter the configuration of software on the mobile phone, such as APPLE ITUNES. Additionally or alternatively, simulation module 108 may use a default or factory-preset configuration for catch-all environment 210 when presenting user 204 with catch-all environment 210.

As an illustrated example, and with returning reference to FIG. 4, a legitimate operator of protected computing environment 208 may configure catch-all environment 210 to provide user 204 with access to decoy data 414 and application 406. In this example, decoy data 414 may represent documents, files, stored passwords, browser history, etc. that may emulate the appearance of a legitimate computing environment while not containing any information that might compromise protected computing environment 208. Similarly, application 406 may represent an application available within catch-all environment 210 that does not contain or access private information. Specifically, application 406 may, when executing from within catch-all environment 210, be unable to access information that resides outside of catch-all environment 210, such as private data 404 in protected computing environment 208. Application 406 may, when executing from within protected computing environment 208 however, be able to access decoy data 414 or other data within catch-all environment 210.

In some examples, simulation module 108 may present user 204 with catch-all environment 210 only in response to specified criteria. In these examples, the systems and methods described herein may provide user 204 with a login failure message each time user 204 enters an authentication attempt that does not meet the specified criteria.

In one embodiment of this concept, simulation module 108 may present user 204 with catch-all environment 210 in response to determination module 106 determining that user 204 has entered a commonly guessed password. In these examples, determination module 106 may determine that authentication attempt 206 included a commonly guessed password, such as "1111" or "1234". Determination module 106 may prompt simulation module 108 to provide user 204 with access to catch-all environment 210 in response to this determination. Moreover, simulation module 108 may refrain from presenting user 204 with catch-all environment 210 until user 204 enters a commonly guessed password.

In an additional example, simulation module 108 may present user 204 with catch-all environment 210 in response to detecting a preconfigured number of illegitimate authentication attempts. In some embodiments, simulation module 108 may present catch-all environment 210 after a single illegitimate authentication attempt. In further embodiments, two or more illegitimate authentication attempts to access the protected computing environment. As with other aspects of the systems and methods described herein, a legitimate operator of protected computing environment 208 may be able to configure the number of illegitimate authentication attempts that must be detected within a predetermined length of time before simulation module 108 will present user 204 with catch-all environment 210. In some embodiments, simulation module 108 may randomize the preconfigured number of illegitimate authentication attempts within a preconfigured range, e.g., a random number between 3 and 5 illegitimate authentication attempts. Similarly, simulation module 108 may wait to present user 204 with access to catch-all environment 210 until a predetermined number of commonly guessed passwords have been entered and/or present user 204 with access to catch-all environment 210 based on any suitable combination of criteria.

Simulation module 108 may also prevent the deletion of information stored within protected computing environment 208. Traditional systems for managing illegitimate authentication attempts may wipe information from a device. For example, an APPLE 105 operating system may allow users to configure devices to wipe user information from the device after a certain number of illegitimate authentication attempts. Simulation module 108 may prevent this deletion of data and instead present user 204 with access to catch-all environment 210.

Catch-all environment 210 may pose as protected computing environment 208 in a variety of ways. As described briefly above, catch-all environment 210 may present user 204 with access to applications that are unable to access private information stored within the protected computing environment. These applications may be able to execute in both protected computing environment 208 as well as catch-all environment 210, but operate under the restrictions of whichever computing environment within which the application is executing. As a specific example, an instance of application 406 in FIG. 4 may execute within protected computing environment 208, where it is afforded access to networking capabilities of computing device 202, private data 404, and the like. However, an instance of application 406 executing within catch-all environment 210 may be prevented from accessing private data 404 and/or certain functionalities of computing device 202. For example, catch-all environment 210 may prevent application 406 from downloading files and/or installing applications to computing device 202.

Additionally or alternatively, catch-all environment 210 may pose as protected computing environment 208 by providing the user with access to decoy files that pose as legitimate files. These decoy files may emulate the look and feel of legitimate files as part of deceiving user 204 into believing that they have gained access to protected computing environment 208. For example, the decoy files may include filenames and/or data that appear to be legitimate data despite not containing information that would compromise the security of protected computing environment 208. For example, decoy files may include data derived from cooking recipes, publicly available news articles, and/or other public sources of information. In some embodiments, a legitimate operator of protected computing environment may create and/or configure the decoy files. Additionally or alternatively, simulation module 108 may receive decoy files from a security vendor.

Simulation module 108 may further cause catch-all environment 210 to pose as the protected computing environment presenting the user with an error message in response to the user attempting to perform a restricted action from within the catch-all environment. For example, catch-all environment 210 may block communications features, software installations, downloads, and/or other functions of computing device 202. Restricting actions in this manner may serve to isolate protected computing environment 208 from user 204 by blocking actions that may allow user 204 to access sensitive data and/or perform other undesirable actions such as downloading software tools that would allow user 204 to manipulate computing device 202 in undesirable ways. For example, catch-all environment 210 may trigger a "network unavailable" error in response to user 204 attempting to download files to catch-all environment 210. Similarly, catch-all environment 210 may display a "message undeliverable" error in response to user 204 attempting to send a text message from within catch-all environment 210. Simulation module 108 may induce these error messages in a variety of ways. For example, simulation module 108 may configure catch-all environment 210 to not have permission from operating system 402 to access various components of computing device 202 and/or operating system 402, thereby causing operating system 402 to display legitimate error messages in response to actions that require those components.

In one embodiment, catch-all environment 210 may pose as protected computing environment 208 by reproducing a user interface of the protected computing environment. Catch-all environment 210 may replicate the overall look and feel of a user interface used by protected computing environment 208. For example, a legitimate operator of protected computing environment 208 may have configured computing device 202 to use a particular configuration for a graphical user interface. Simulation module 108 may configure catch-all environment 210 to use the same or a similar configuration for a graphical user interface presented to user 204. As an additional example, simulation module 108 may cause catch-all environment 210 to display a background image (sometimes colloquially referred to as a wallpaper). Simulation module 108 may use a default background image or alternatively use the same background image as protected computing environment 208.

Furthermore, in some examples simulation module 108 may replicate data from protected computing environment 208 for use in catch-all environment 210. For example, simulation module 108 may copy a background image used in protected computing environment 208 for use as a background image of catch-all environment 210. As an additional example, simulation module 108 may reproduce files from protected computing environment 208 in catch-all environment 210. In this example, simulation module 108 may replace sensitive data in the files copied from protected computing environment 208 with decoy data. Moreover, simulation module 108 may use data derived from files and/or applications in protected computing environment 208 in varying combinations to generate decoy files for use in catch-all environment 210. Again, simulation module 108 may prevent sensitive data from being used to generate the decoy files.

Simulation module 108 replace sensitive data copied from protected computing environment 208 in a variety of ways. For example, simulation module 108 may determine that a file has been whitelisted for use in catch-all environment 210, and accordingly present user 204 with the file through catch-all environment 210. In this example, simulation module 108 may determine that the file has been whitelisted based on metadata of the file, an entry in a database indicating that the file has been whitelisted, and/or determining that the file is of a whitelisted data type. Similarly, simulation module 108 may avoid using certain files in catch-all environment 210 based on those files being blacklisted for use in catch-all environment 210. Additionally or alternatively, simulation module 108 may select and/or avoid selecting files based on heuristic analysis of those files. For example, simulation module 108 may avoid using files containing information that matches certain formats, such as passwords, social security numbers, credit card numbers, photos of a legitimate operator's face, etc.

Furthermore, a legitimate operator of protected computing environment 208 may configure individual details, such as the above-described background image, of catch-all environment 210. Additionally or alternatively, the legitimate operator may direct simulation module 108 to use specific files in catch-all environment 210. The legitimate operator may configure the details of catch-all environment 210 in any suitable manner, such as through an interface presented through protected computing environment and/or through a desktop application, as described in greater detail above. This user configuration may occur before, after, and/or concurrently with automated functions of simulation module 108.

Figure 5:
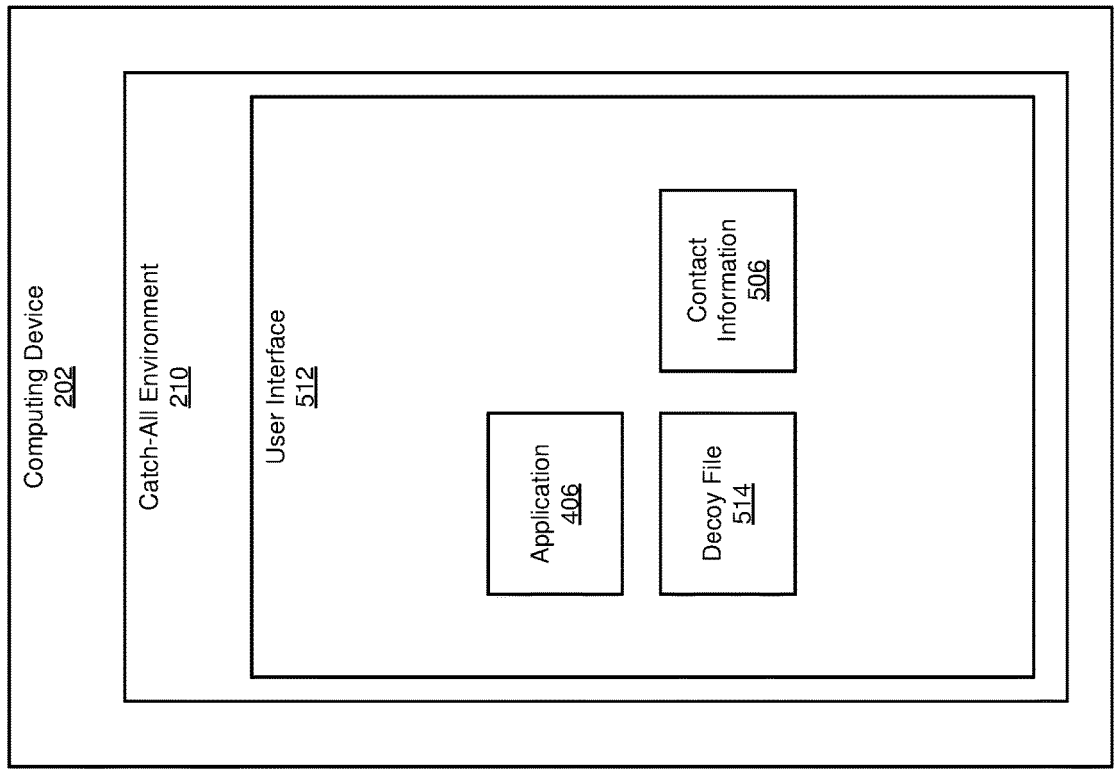
FIG. 5 is a block diagram illustrating example user interfaces used in managing illegitimate authentication attempts.
Figure 5:
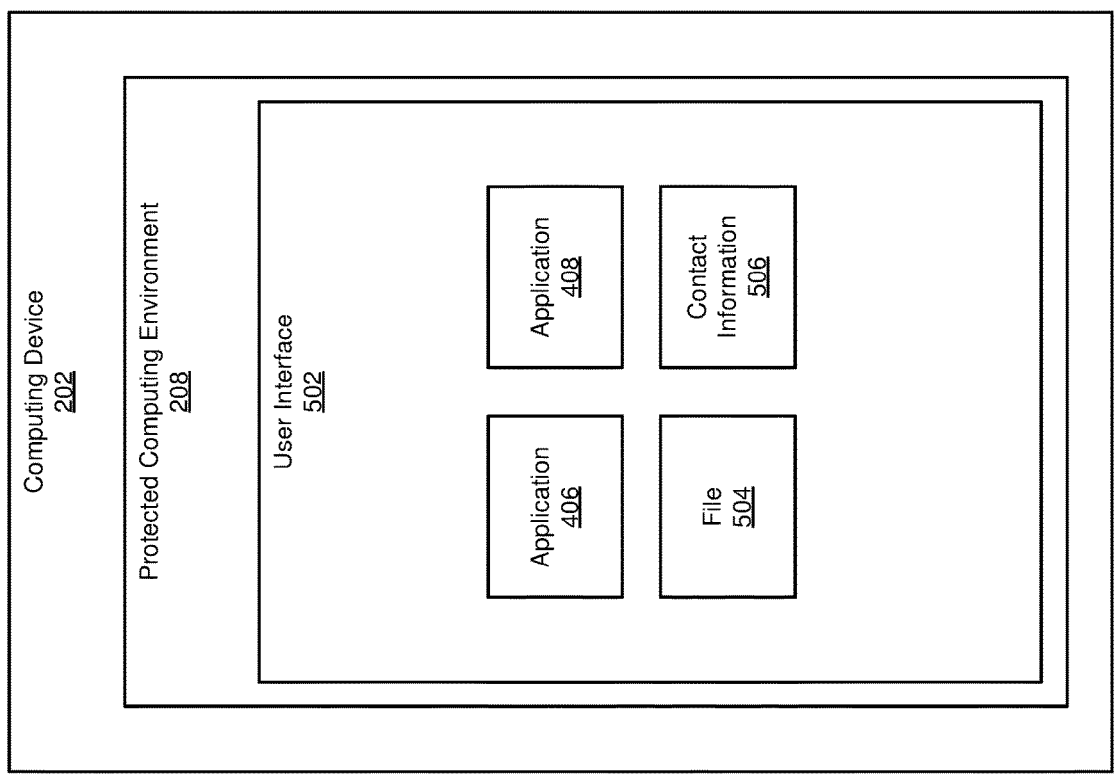

An illustrated example of catch-all environment 210 posing as protected computing environment 208 is shown in FIG. 5. As illustrated in the left-side example, computing device 202 may present protected computing environment 208 to a legitimate operator who submitted a legitimate authentication attempt. Protected computing environment 208 may load user interface 502 and allow the legitimate operator to access applications 406 and 408, file 504, and contact information 506. User interface 502 may include a variety of distinguishing features, such as the overall aesthetic and design, background images, arrangement of icons, etc. Catch-all environment 210 may mimic this user interface by displaying user interface 512. However, catch-all environment 210 may have access to different applications and data than protected computing environment 208. In the example of FIG. 5, the systems and methods described herein may have determined that user 204 was performing a benign yet illegitimate authentication attempt. Simulation module 108 may, based on this determination, cause catch-all environment 210 to present user 204 with application 406, decoy file 514, and contact information 506.

In embodiments where determination module 106 determines that authentication attempt 206 represents a benign authentication attempt despite being illegitimate, determination module 106 may prompt elements of modules 102 and/or other software executing on computing device 202 to modify the configuration of catch-all environment 210. For example, determination module 106 may prompt simulation module 108 to configure catch-all environment 210 to allow user 204 to access contact information for an owner or other legitimate operator of computing device 202. As a specific example, determination module 106 may, in response to determining that authentication attempt 206 represents an illegitimate yet benign authentication attempt, cause simulation module 108 to configure catch-all environment 210 with a contacts list that includes contact information for an owner of computing device 202. Simulation module 108 may thus facilitate user 204 discovering the contact information and enable user 204 to contact the owner of computing device 202.

Figure 6:
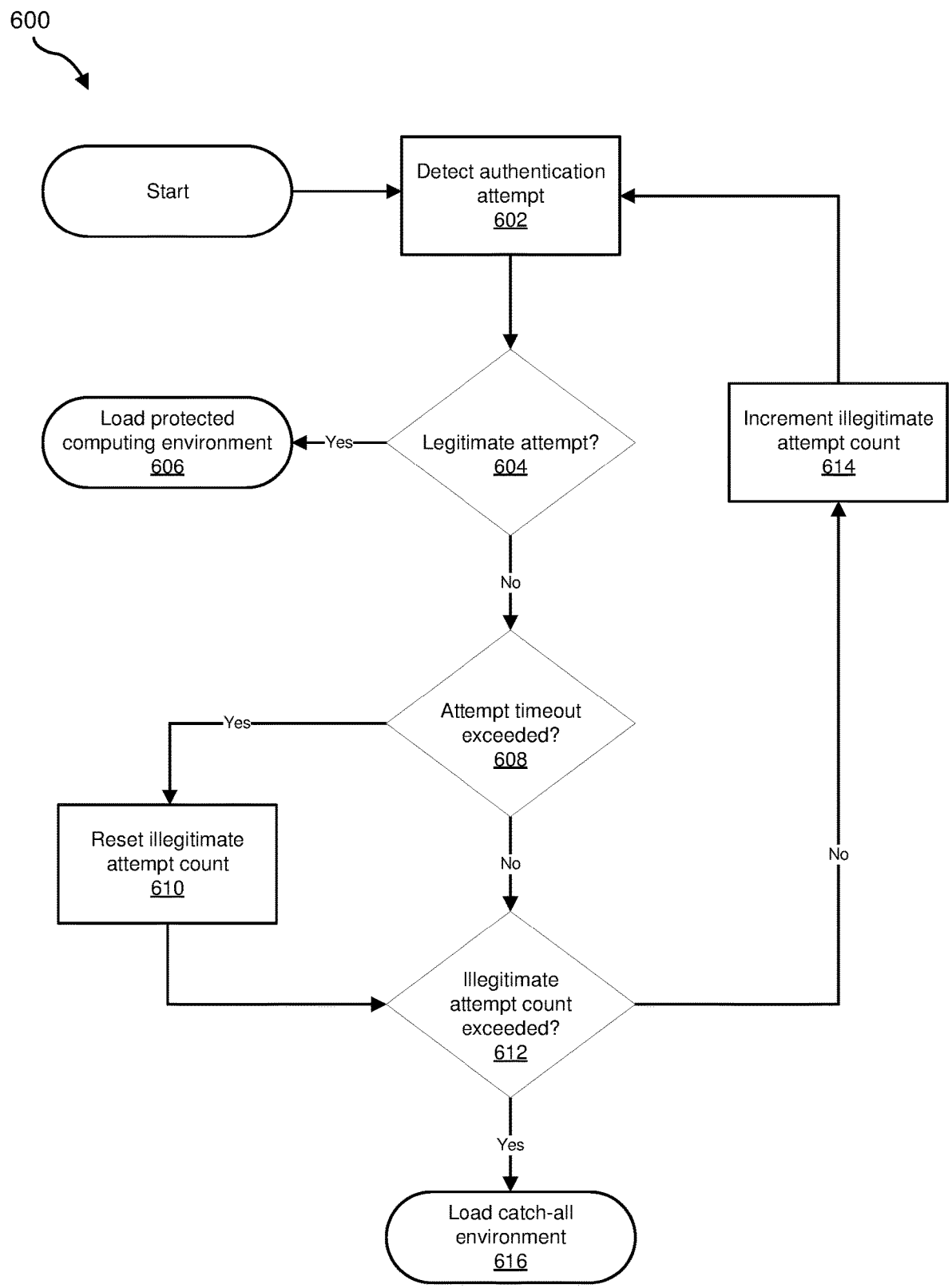
FIG. 6 is a flow diagram of an example decision flow for managing illegitimate authentication attempts.

An example process flow for determining whether to present user 204 with catch-all environment 210 is shown in FIG. 6. At step 602 in FIG. 6, detection module 104 may detect an authentication attempt to computing device 202. At step 604, determination module 106 may determine whether the authentication attempt is a legitimate attempt. If the authentication attempt is legitimate, determination module 106 may proceed to step 606 and load protected computing environment 208, ending the process flow. If determination module 106 determines that the authentication attempt is illegitimate, determination module 106 may proceed to step 608 and determine whether the latest illegitimate authentication attempt occurred within a specified timeframe of another illegitimate authentication attempt (e.g., the illegitimate attempts occurred within a minute of each other). If the timeout limit has been exceeded, determination module 106 may proceed to step 610 and reset the number of illegitimate attempts detected before proceeding to step 612. If the timeout limit has not been exceeded, determination module 106 may proceed directly to step 612.

At step 612 in FIG. 6, determination module 106 may determine whether the number of illegitimate attempts detected within the timeout period exceeds a preconfigured number of illegitimate attempts. If the illegitimate attempt count has not been exceeded, determination module 106 may increment the illegitimate attempt count at step 614 and return to step 602. If the illegitimate attempt count has been exceeded, determination module 106 may proceed to step 616 and cause simulation module 108 to load catch-all environment 210.

Regardless of whether user 204 performs a benign illegitimate authentication attempt or not, the systems and methods described herein may perform security actions in response to the illegitimate authentication attempt. In one embodiment, systems described herein may perform actions such as (i) capturing an image of user 204's face, (ii) notifying a legitimate operator of protected computing environment 208, (iii) capturing a location of computing device 202, and/or (iv) encrypting private data that resides within protected computing environment 208. These security actions may assist a legitimate operator of protected computing environment 208 in identifying individuals who attempt to access protected computing environment and/or aid legitimate operators in recovering computing device 202. For example, if an individual loses their mobile phone which is later found by a would-be thief, the systems and methods described herein may capture an image of the thief's face, capture geolocation coordinates of the phone, and notify the phone's owner. The systems and methods described herein may also encrypt data stored within protected computing environment 208 to prevent the thief from accessing the device owner's personal data, such as contact information, account passwords, and the like.

As described in greater detail above in connection with example method 300 in FIG. 3, the systems and methods described herein may determine that a user is performing illegitimate authentication attempts to a protected computing environment. The systems and methods described herein may respond to these illegitimate authentication attempts by simulating a successful login attempt, presenting the user with a catch-all environment rather than the protected computing environment that would be displayed to a user who performed a legitimate authentication attempt. For example, a mobile device such as a smartphone may be configured to respond to illegitimate authentication attempts by activating a catch-all environment once certain criteria, such as detecting a certain number of illegitimate authentication attempts, has been reached. These criteria may prevent the user from becoming suspicious, as random password guessing may generally be unsuccessful on the first attempt.

The catch-all environment may emulate the look and feel of a successful authentication attempt, thereby providing the illusion that the illegitimate authentication attempts have gained access to the device. The catch-all environment, however, may only contain preconfigured data and/or applications that is unable to compromise the security of the device. Such security may be maintained by sandboxing the catch-all environment from the rest of the device, blocking and/or intercepting various device features such as SMS messaging, network downloads, and the like. Activation of the catch-all environment may also prevent other systems from wiping user data from the device. The systems and methods described herein may thereby ensure that the device remains secure while simultaneously preserving user data.

Figure 7:
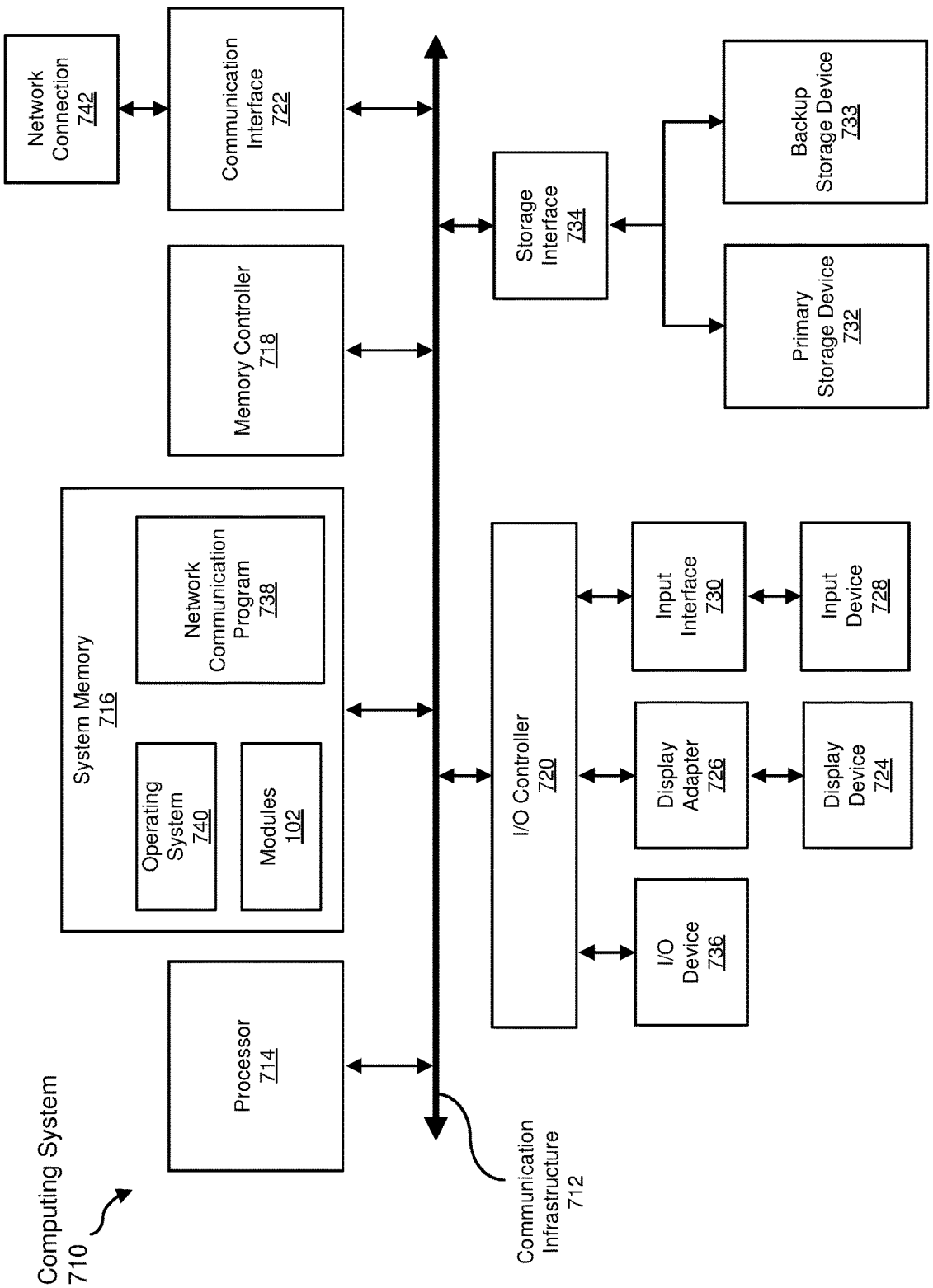
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
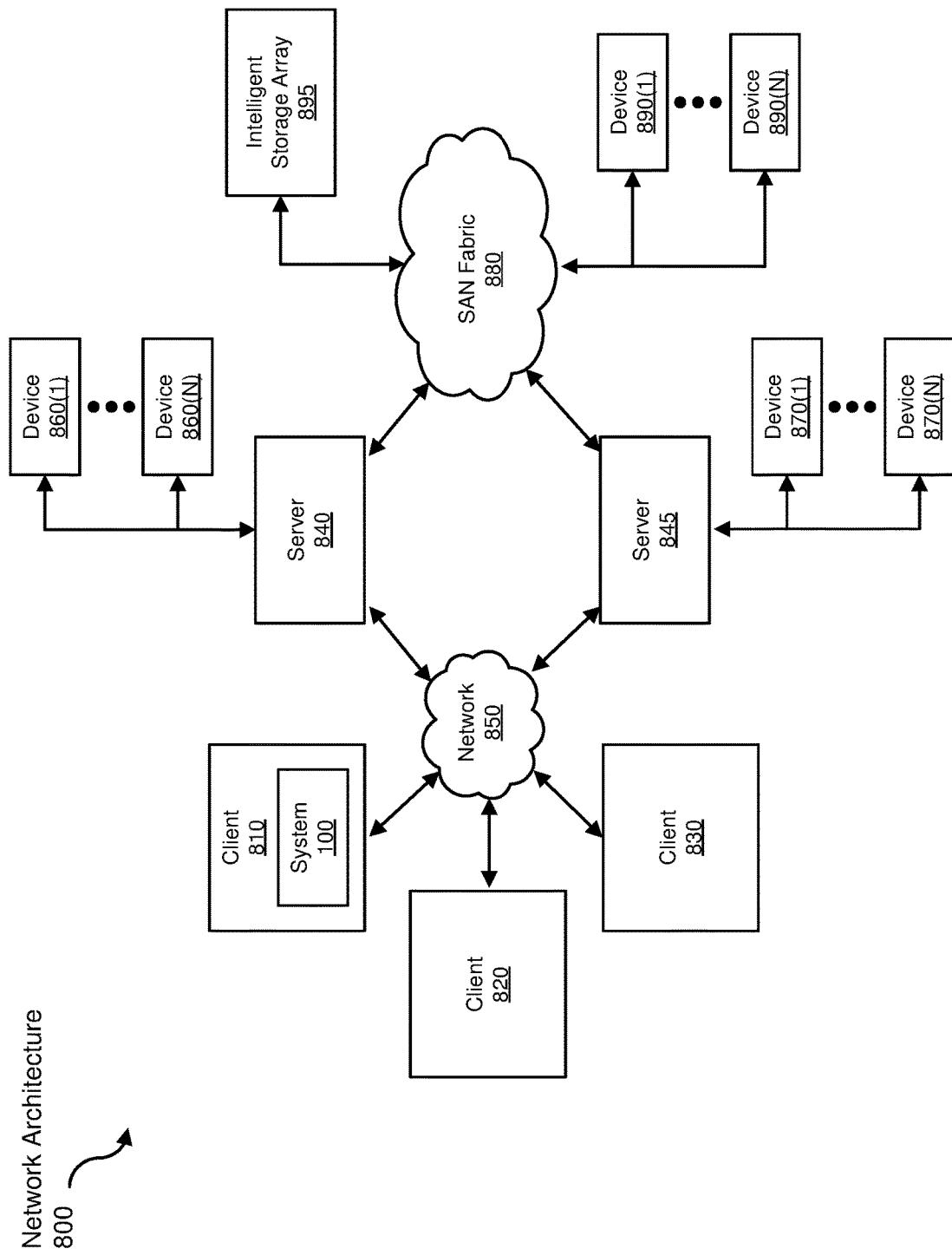
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for managing illegitimate authentication attempts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive authentication information, use the authentication information to determine that the authentication information represents an illegitimate authentication attempt, use a result of the determination to configure a catch-all environment, use the configured catch-all environment to simulate a protected computing environment, and provide the configured catch-all environment to the user that submitted the illegitimate authentication attempt. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing illegitimate authentication attempts to a computing device, at least a portion of the method being performed by at least one processor included on the computing device, the method comprising:

detecting an authentication attempt performed by an unauthenticated user to gain access to a protected computing environment on the computing device;

determining that the authentication attempt to access the protected computing environment is illegitimate; and providing, in response to the determination, the unauthenticated user with access to a catch-all environment on the computing device that isolates the protected computing environment from the unauthenticated user, the catch-all environment simulating a successful attempt to authenticate to the protected computing environment by posing as the protected computing environment.

2. The method of claim 1, wherein simulating the successful attempt to authenticate to the protected computing environment; comprises preventing deletion of information stored within the protected computing environment.

3. The method of claim 1, wherein determining that the authentication attempt is illegitimate comprises determining that the unauthenticated user has entered an incorrect password.

4. The method of claim 3, wherein determining that the authentication attempt is illegitimate further comprises determining that the incorrect password is represented on a previously configured list of commonly guessed passwords.

5. The method of claim 1, wherein determining that the authentication attempt to access the protected computing environment is illegitimate comprises detecting a preconfigured number of illegitimate authentication attempts that comprises two or more illegitimate authentication attempts to access the protected computing environment.

6. The method of claim 1, wherein determining that the authentication attempt to access the protected computing environment is illegitimate comprises:
capturing an image of the face of the unauthenticated user;
for each known legitimate operator of the protected computing environment, attempting to match the image of the face of the unauthenticated user to an image of the known legitimate operator; and
determining, based on failing to match the image of the face of the unauthenticated user to any image of a known legitimate operator of the protected computing environment, that the authentication attempt is illegitimate.

7. The method of claim 1, further comprising:
classifying the authentication attempt as benign despite being illegitimate; and
modifying a configuration of the catch-all environment by revealing, within the catch-all environment, pre-configured private information to the unauthenticated user based on determining that the authentication attempt is benign.

8. The method of claim 7:
further comprising capturing an image of the face of the unauthenticated user; and
wherein classifying the authentication attempt as benign comprises:
performing a facial state analysis on the image of the face of the unauthenticated user to determine a facial expression of the unauthenticated user; and
classifying the authentication attempt as benign based on the facial expression of the unauthenticated user.

9. The method of claim 1, wherein the catch-all environment poses as the protected computing environment and isolates the protected computing environment from the unauthenticated user by providing the unauthenticated user with access to applications executable from within the catch-all environment that are unable to access private information stored within the protected computing environment.

10. The method of claim 1, wherein the catch-all environment poses as the protected computing environment and isolates the protected computing environment from the unauthenticated user by providing the unauthenticated user with access to decoy files included in the catch-all environment that pose as legitimate files stored within the protected computing environment.

11. The method of claim 1, wherein the catch-all environment poses as the protected computing environment and isolates the protected computing environment from the unauthenticated user by presenting the unauthenticated user with an error message in response to the unauthenticated user attempting to perform a restricted action from within the catch-all environment.

12. The method of claim 1, wherein the catch-all environment poses as the protected computing environment and isolates the protected computing environment from the unauthenticated user by reproducing a user interface of the protected computing environment within the catch-all computing environment.

13. The method of claim 1, further comprising performing, in response to the determination, a security action comprising at least one of:
capturing an image of the face of the unauthenticated user;
notifying a legitimate operator of the protected computing environment;
capturing a location of the computing device; and
encrypting private data that resides within the protected computing environment.

14. The method of claim 1, wherein the computing device is a mobile device.

15. The method of claim 1, further comprising configuring, prior to detecting the authentication attempt, the catch-all environment on the computing device to provide the unauthenticated user with access to at least one of:
a decoy file included in the catch-all environment that does not contain private information;
an application that is executable from within the catch-all environment;
legitimate contact information to an individual on a contacts list that resides within the protected computing environment; and
access to a function that is enabled by the protected computing environment and is not a restricted function that is restricted by a legitimate operator of the protected computing environment.

16. A system included on a computing device for managing authentication attempts to the computing device, the system comprising:
a protected computing environment;
a catch-all environment that isolates the protected computing environment from an unauthenticated user;
a detection module, stored in a memory of the system, that detects an authentication attempt performed by the unauthenticated user to gain access to the protected computing environment;
a determination module, stored in the memory, that determines that the authentication attempt to access the protected computing environment is illegitimate;
a simulation module, stored in the memory, that in response to the determination, enables the catch-all environment to simulate a successful attempt to authenticate to the protected computing environment by posing as the protected computing environment, and provides the unauthenticated user with access to the catch-all environment; and at least one physical processor that executes the detection module, the determination module, and the simulation module.

17. The system of claim 16, further comprising a prevention module that, in response to the simulation module enabling the catch-all environment to simulate the successful attempt to authenticate to the protected computing environment, prevents deletion of information stored within the protected computing environment.

18. The system of claim 16, wherein the determination module determines that the unauthenticated user has entered an incorrect password.

19. The system of claim 18, wherein the determination module determines that the incorrect password is represented on a previously configured list of commonly guessed passwords.

20. A non-transitory computer-readable medium comprising one or more computer-readable instructions that, when executed by at least one processor of a computing device, cause the computing device to:
- detect an authentication attempt performed by an unauthenticated user to gain access to a protected computing environment on the computing device;
- determine that the authentication attempt to access the protected computing environment is illegitimate; and
- provide, in response to the determination, the unauthenticated user with access to a catch-all environment on the computing device that isolates the protected computing environment from the unauthenticated user, the catch-all environment simulating a successful attempt to authenticate to the protected computing environment by posing as the protected computing environment.

* * * * *

UNITED STATES PATENT AND TRADEMARK OFFICE
CERTIFICATE OF CORRECTION

PATENT NO. : 10,673,888 B1  
APPLICATION NO. : 15/842095  
DATED : June 2, 2020  
INVENTOR(S) : Ajey Dudhe et al.

Page 1 of 1

It is certified that error appears in the above-identified patent and that said Letters Patent is hereby corrected as shown below:

In the Claims

In Column 23, Line 10, Claim 2, delete "environment;" and insert -- environment -- therefor.

Signed and Sealed this
Twenty-first Day of July, 2020

Andrei Iancu
*Director of the United States Patent and Trademark Office*